United States Patent [19]
Fong et al.

[11] 4,238,330
[45] Dec. 9, 1980

[54] FLOTATION AIDS FOR OIL-IN-WATER EMULSIONS

[75] Inventors: Dodd W. Fong; Ronald J. Allain, both of Richmond, Tex.

[73] Assignee: Nalco Chemical Company, Oak Brook, Ill.

[21] Appl. No.: 57,663

[22] Filed: Jul. 18, 1979

[51] Int. Cl.³ ............................................. B01D 17/04
[52] U.S. Cl. ..................................... 210/708; 252/344
[58] Field of Search .................. 210/43, 54; 252/341, 252/344

[56] References Cited
U.S. PATENT DOCUMENTS

| | | | |
|---|---|---|---|
| 3,316,181 | 4/1967 | Sackis | 252/341 X |
| 3,691,086 | 9/1972 | Lees et al. | 210/43 X |
| 4,154,698 | 5/1979 | Doft | 252/341 X |
| 4,179,369 | 12/1979 | Bradley et al. | 210/43 |

*Primary Examiner*—Thomas G. Wyse
*Attorney, Agent, or Firm*—Kinzer, Plyer, Dorn & McEachran

[57] ABSTRACT

An oil-in-water emulsion is separated to float the oil by adding to the emulsion a cationic polyacrylamide.

3 Claims, No Drawings

FLOTATION AIDS FOR OIL-IN-WATER EMULSIONS

The invention relates to the separation of an oil-in-water emulsion to float the oil and thereby clarify the water. The invention has particular utility for recovering water used in secondary recovery of petroleum in the oil field country but would also be useful in recovering water from other oil-in-water emulsions.

The primary object of the present invention is to enhance the clarification of water in an oil-in-water emulsion, or the converse, to enhance the recovery of oil from such an emulsion.

Another object of the invention is to afford certain cationic acrylamide polymers which are superior to a commercially used acrylate in separating an oil-in-water emulsion.

The sulfate (salt) of dimethylaminoethylmethacrylate (DMAEMA) is a known agent for separating an oil-in-water oil field emulsion. It was employed as a control or standard under the present invention.

To determine the efficacy of the presently claimed polymers as floatation aids in the recovery of water in comparison to the standard an actual sample of an oil-in-water emulsion resulting from secondary recovery at an oil well site was employed, with the results set forth in the following table:

TABLE 1

| Treatment Polymer | PPM Polymer | Absorbance | Intrinsic Viscosity |
|---|---|---|---|
| 100% DMAEMA Sulfate | 1.1 | 10 | 2 |
|  | 2.2 | 1 |  |
|  | 3.3 | 1 |  |
|  | 4.4 | 1 |  |
|  | 5.5 | 1 |  |
| 25% DEAEMAA-AA diethylaminoethyl methacrylamide, acrylamide copolymer | 1.1 | 1 | 10.5 |
|  | 2.2 | 1 |  |
|  | 3.3 | 1 |  |
|  | 4.4 | 1 |  |
|  | 5.5 | 1 |  |
| 60% DMAPMAA-AA dimethylaminopropyl methacrylamide, acrylamide copolymer | 1.1 | 1 | 4.5 |
|  | 2.2 | 1 |  |
|  | 3.3 | 1 |  |
|  | 4.4 | 1 |  |
|  | 5.5 | 1 |  |
| 60% DEAPMAA-AA diethylaminopropyl methacrylamide, acrylamide copolymer | 1.1 | 1 | 6.1 |
|  | 2.2 | 1 |  |
|  | 3.3 | 1 |  |
|  | 4.4 | 1 |  |
|  | 5.5 | 1 |  |
| 60% DBAPMAA-AA dibutylaminopropyl methacrylamide, acrylamide, copolymer | 1.1 | 1 | 4.9 |
|  | 2.2 | 1 |  |
|  | 3.3 | 1 |  |
|  | 4.4 | 1 |  |
|  | 5.5 | 1 |  |
| 60% DMAEAA-AA dimethylaminoethyl acrylamide, acrylamide copolymer | 1.1 | 1 | 9.0 |
|  | 2.2 | 1 |  |
|  | 3.3 | 1 |  |
|  | 4.4 | 1 |  |
|  | 5.5 | 1 |  |
| 60% DMAPAA-AA dimethylaminopropyl acrylamide, acrylamide copolymer | 1.1 | 1 | 4.5 |
|  | 2.2 | 1 |  |
|  | 3.3 | 1 |  |
|  | 4.4 | 1 |  |
|  | 5.5 | 1 |  |
| 60% DEAEMAA-AA diethylaminoethyl methacrylamide, acrylamide copolymer | 1.1 | 1 | 5.6 |
|  | 2.2 | 1 |  |
|  | 3.3 | 1 |  |
|  | 4.4 | 1 |  |
|  | 5.5 | 1 |  |

The percentage sign (%) associated with the polymer identifies the weight percent due to the cationic quaternary acrylamide fragment. Thus 25% DEAEMAA-AA signifies twenty-five weight percent diethylaminoethyl (methacrylamide) in the copolymer, the remainder of seventy-five weight percent being represented by the unsubstituted acrylamide (-AA) fragment. Similarly 60% DMAEAA-AA signifies sixty weight percent dimethylaminoethyl acrylamide fragment in the copolymer remainder forty percent unsubstituted acrylamide (AA).

Absorbance was determined by spectrophotometer; a lower value (1) identifies a clearer solution than a higher value (10). It will therefore be seen that at the very commencement when using only 1.1 ppm the copolymer acrylamides are superior to the sulfate standard.

The surprising aspect of the test was that a related homologue of the superior copolymers exhibited inferior results (DMAEMAA-AA); also, when the weight percent of the quarternary amide fragment was reduced from 60% to 25% all of the successful polymers except DEAEMAA-AA exhibited effectiveness less than the standard, notably:

TABLE II

| Treatment Polymer | PPM Polymer | Absorbance | Intrinsic Viscosity |
|---|---|---|---|
| 25% DMAEMAA-AA | 1.1 | 10 | 12.7 |
|  | 2.2 | 1 |  |
|  | 3.3 | 4 |  |
|  | 4.4 | 8 |  |
|  | 5.5 | 10 |  |
| 60% DMAEMAA-AA | 1.1 | 6 | 7.7 |
|  | 2.2 | 4 |  |
|  | 3.3 | 4 |  |
|  | 4.4 | 5 |  |
|  | 5.5 | 12 |  |
| 25% DMAPMAA-AA | 1.1 | 22 | 10.7 |
|  | 2.2 | 18 |  |
|  | 3.3 | 18 |  |
|  | 4.4 | 20 |  |
|  | 5.5 | 22 |  |
| 25% DEAPMAA-AA | 1.1 | 20 | 11.9 |
|  | 2.2 | 1 |  |
|  | 3.3 | 1 |  |
|  | 4.4 | 1 |  |
|  | 5.5 | 1 |  |
| 25% DBAPMAA-AA | 1.1 | 25 | 9.5 |
|  | 2.2 | 1 |  |
|  | 3.3 | 1 |  |
|  | 4.4 | 1 |  |
|  | 5.5 | 1 |  |
| 25% DMAEAA-AA | 1.1 | 15 | 10.8 |
|  | 2.2 | 9 |  |
|  | 3.3 | 9 |  |
|  | 4.4 | 9 |  |
|  | 5.5 | 9 |  |
| 25% DMAPAA-AA | 1.1 | 3 | 12.8 |
|  | 2.2 | 3 |  |
|  | 3.3 | 3 |  |
|  | 4.4 | 3 |  |
|  | 5.5 | 3 |  |

The effective amount of the preferred acrylamide copolymer under the present invention may be in (aqueous) latex form, thirty percent by weight for example. In the field, the latex would be pumped into the pipe which conducts the oil-in-water emulsion at the oil well site where secondary recovery is being effected and separation of the two phases inside the pipe then occurs inherently. The floated oil may then be separated in the usual way at a recovery tank.

Routine experimentation would reveal the limits for the weight of the unsubstituted acrylamide fraction (-AA) other than those set forth and such variations, if effective, are deemed equivalent to the percentages specified above.

We claim:

1. The method of treating oil-in-water emulsion to separate the emulsion and float the oil in the water incidental to recovering one of the emulsion phases, comprising the step of adding to the emulsion an effective amount of a cationic polyacrylamide selected from the group consisting of:
   (A) diethylaminoethlmethacrylamide, acrylamide copolymer; and
   (B) dimethyl, diethyl and dibutyl aminopropylmethacylamide, acrylamide copolymer; diethylaminoethylmethacrylamide, acrylamide copolymer; and dimethylaminoethyl and dimethylaminopropyl acrylamide, acrylamide copolymer;
   wherein the unsubstituted acrylamide fraction of (A) is about 75% weight and wherein the unsubstituted fraction of (B) is about 40%.

2. The method according to claim 1 wherein the polymer is employed in latex form and wherein the effective amount is about 1 ppm added to the emulsion.

3. The method according to claim 1 or 2 wherein the emulsion is crude oil in water conducted in a pipe at an oil well site where the water is employed for secondary recovery, and wherein the copolymer is introduced into said pipe.

* * * * *